United States Patent
Rhea

(10) Patent No.: US 7,267,271 B2
(45) Date of Patent: Sep. 11, 2007

(54) SYSTEM AND METHOD FOR COMPONENT INVENTORY TRACKING WITH SHIPPER IDENTIFICATION CODES

(75) Inventor: Henry Rhea, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 542 days.

(21) Appl. No.: 10/869,735

(22) Filed: Jun. 16, 2004

(65) Prior Publication Data
US 2005/0283411 A1 Dec. 22, 2005

(51) Int. Cl.
G06F 19/00 (2006.01)
(52) U.S. Cl. ............... 235/385; 235/383; 235/375
(58) Field of Classification Search ........... 235/383, 235/385, 375
See application file for complete search history.

(56) References Cited

U.S. PATENT DOCUMENTS

| | | | |
|---|---|---|---|
| 5,646,389 A * | 7/1997 | Bravman et al. | 235/385 |
| 5,900,610 A | 5/1999 | Kelly, Jr. | 235/385 |
| 6,148,291 A | 11/2000 | Radican | 705/28 |
| 6,681,990 B2 | 1/2004 | Vogler et al. | 235/385 |

* cited by examiner

Primary Examiner—Karl D. Frech
(74) Attorney, Agent, or Firm—Hamilton & Terrile, LLP; Robert W. Holland

(57) ABSTRACT

Inventory management of plural components at an end user inventory is simplified by tracking components with shipment identification codes used to ship the components from a component vendor through a shipment vendor. A component order module associated with the end user places components orders with a component vendor order engine for shipment by the shipment vendor. The component vendor order engine obtains a shipment identification code for shipment of the component and provides the code to the end user component order module. The component ships in a container having the shipment identification code presented on the exterior as a barcode that is scanned on delivery of the container to the end user. After delivery, an inventory manager tracks the component in the inventory with the shipment identification barcode until the component is used. Removal of the component tracked by a scan of the barcode by the inventory manager may trigger re-order of the component from the component vendor with the component identified by the shipment identification code.

20 Claims, 2 Drawing Sheets

SYSTEM AND METHOD FOR COMPONENT INVENTORY TRACKING WITH SHIPPER IDENTIFICATION CODES

BACKGROUND OF THE INVENTION

1. Field of the Invention

The present invention relates in general to the field of inventory tracking, and more particularly to a system and method for tracking information handling system parts shipped for remote inventory management.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are often assembled from a number of component parts, including software and peripherals, which interact to communicate, print or otherwise process information. For instance, a typical information handling system has a housing that internally supports a motherboard coupled to components such as a central processing unit, random access memory, and various microcontrollers and busses. Other components internal to the housing typically interface with the motherboard either to handle information, such as hard disc drives, optical disc drives and network interface cards or to provide operating functions such as power and cooling. Generally, the housing has a number of ports that interface with external components, such as monitors and printers. Information handling system components are sometimes interchangeable, such as video cards that comply with the VGA standard, and are sometimes built to perform specialized functions with specific equipment, such as ink jet cartridges that work with limited types of ink jet printers. Often, businesses that maintain a number of information handling systems to support employees also maintain an inventory of components to allow rapid repair of information handling systems that suffer a component failure. Business also typically maintain an inventory of information handling system peripheral consumables, such as ink jet cartridges and toner, to replace these consumables as needed without substantially interrupting operation of the peripherals.

Maintaining an inventory of components, including consumables, presents a significant challenge to a business. Generally, a business will track components with an inventory management system to ensure an adequate and timely supply and to reduce theft of what are often expensive parts. Inventory management systems typically provide indications to a business' information technology staff when a particular component reaches a low inventory level so that the staff may replenish the inventory. Generally, information technology staff orders the components from the manufacturer of the information handling systems for delivery by various third party vendors, such as Federal Express or United Parcel Services. For instance, components are often ordered through the Internet by submitting an order at a Web site or through e-mail.

Once the components arrive, they are entered into the inventory management system with appropriate identification information, such as part number, the quantity in a shipment, and the quantity actually available by a physical inventory count in a defined location. Generally, in order to track components having the same part number, a unique identifier is generated at the business, such as a barcode sticker having a unique serial number that is affixed to packages as the packages arrive. The inventory management system or a related tool creates the sticker so that the information technology staff may take physical inventory counts and track replenishment and consumption of inventory with a scanner device. However, the creation of additional identifiers for inventory increases the complexity of tracking inventory and thus the chances of errors. Further, internally created inventory numbers do not correspond with vendor invoice or shipper tracking numbers, thus making automated communication of inventory information more difficult. For instance, information technology staff typically must correlate order numbers to an air bill and an internal number in order to confirm receipt of ordered inventory. Although this problem is aggravated with information handling system inventory management due to the diversity of components, similar difficulties arise in tracking other types of inventory.

SUMMARY OF THE INVENTION

Therefore a need has arisen for a system and method which tracks inventory with reduced numbers of tracking identification code.

In accordance with the present invention, a system and method are provided which substantially reduce the disadvantages and problems associated with previous methods and systems for tracking inventory. Components ordered by an end user from a component vendor for stocking into end user inventory, such as information handling system components, are tracked in the end user inventory by reference to the shipment identification code used by a shipping vendor to ship the component to the end user from the component vendor.

More specifically, an inventory manager associated with a component end user location reads barcodes associated with components to identify the components. A component order module of the end user places orders for components with a component vendor order engine to stock an end user inventory, such as with electronic messages sent through the Internet. The vendor component order engine obtains a shipment identification code for shipping the component in a container through a shipment vendor to the end user and communicates the identification code to the end user inventory manager. The component container has a label affixed with the shipment identification code presented as a barcode which the shipment vendor uses to identify the container and its destination. Upon delivery of the container with the ordered component at the end user location, the inventory manager enters the component into the inventory by reference to the shipment identification code, which is associated with the component information from the order. During periodic inventory stock counts, the shipment label barcode is scanned to identify the component in the inventory. Upon use of the component, a scan of the barcode identifies the component to allow a change of its status from storage as stock in the inventory to removed from the inventory. Communication of the shipment identification code to the component vendor is used to indicate use of the component, such as for automated restocking of the inventory.

The present invention provides a number of important technical advantages. One example of an important technical advantage is that a common unique identifier is available for managing the ordering, shipment and internal tracking of information handling system components. Shipper identification information provides the unique identifier with a bar code readable by a scanner already affixed to the shipment upon arrival at the end user location. Arrival and inventory of shipments at an end-user location with the shipper identification information allows a positive confirmation of delivery with a common identifier for the component vendor, the shipper and the end-user through an interface with the end-user's inventory management system. Similarly, as an end-user consumes inventory, scans of the shipper identification information provide a common reference for the end user and the component vendor to arrange subsequent orders that replenish the consumed component. Since the shipment identification code is unique across all vendors, an end user has a single source of unique identifiers for inventory management even where plural component vendors provide components.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Effective component inventory management reduces costs by securing components from loss or theft and by ensuring a timely supply of components is available to replace defective operational components. In particular, effective component management helps keep information handling system resources operational with the timely availability of the many types of components that may need replacement and with the timely replenishment of the components as they are used, such as with shipments made through shipment vendors from the manufacturer of the information handling systems. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
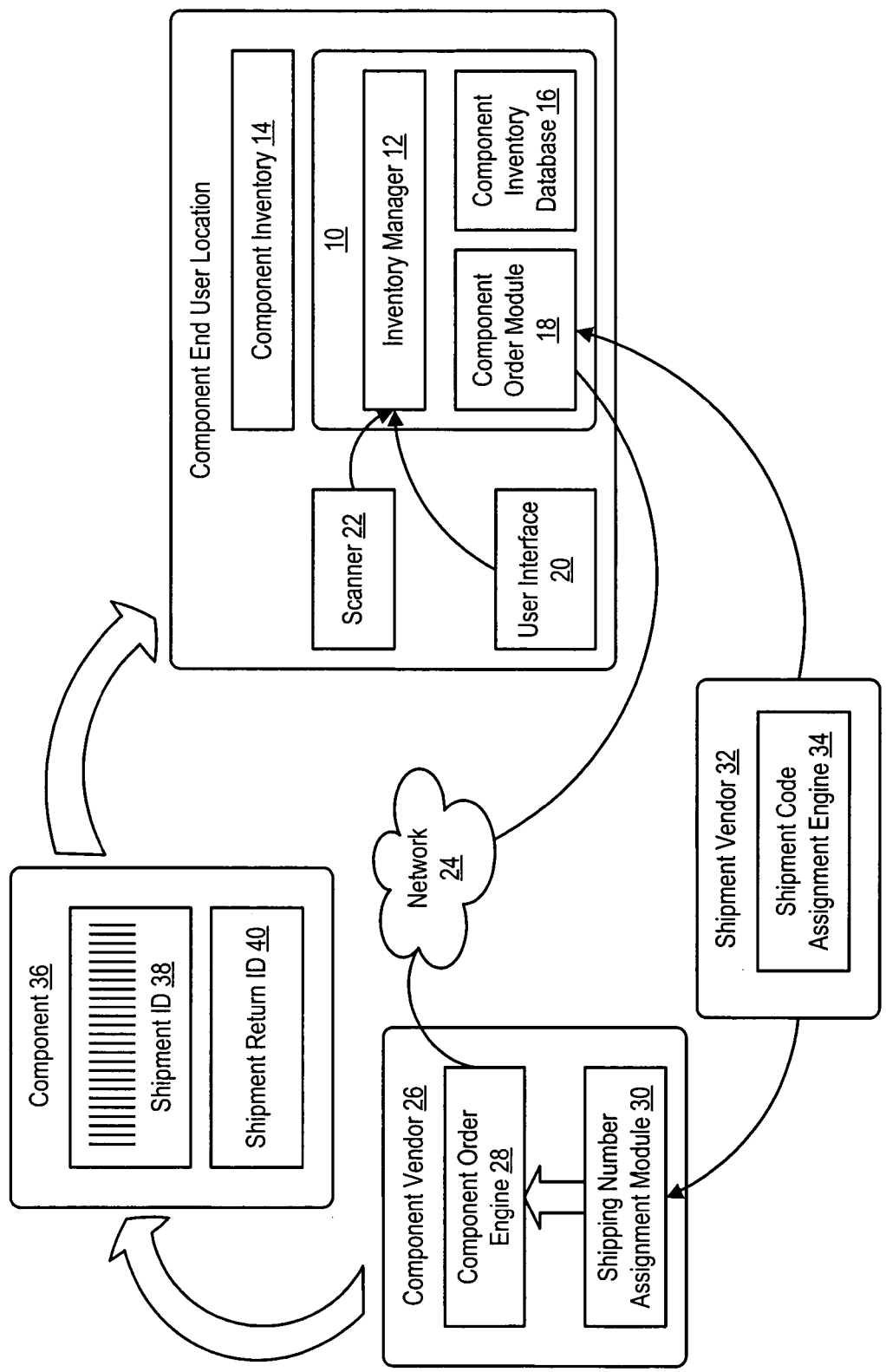
FIG. 1 depicts a block diagram of a system for managing end user inventory of components sent by a component vendor with shipment identification codes of a shipment vendor.

Referring now to FIG. 1, a block diagram depicts a system for managing end user inventory of components sent by a component vendor with shipment identification codes of a shipment vendor. An information handling system 10 associated with the location of the component end user supports an inventory manager 12 that manages a component inventory 14, such as information handling system components to support information handling systems of the end user. The component inventory is tracked by inventory manager 12 and stored in a component inventory database 16, such as a relational database that associates each component container by an identification number with information regarding the type and function of the component. For instance, as additional components are needed for component inventory 14, a component order module 18 creates a component order that specifies the component with end user inputs through a user interface 20. When an ordered component arrives at component inventory 14, a scanner 22 scans an identification code from the component, such as a unique barcode on the exterior of the component container, and inventory manager 12 stores the information from the component order in component inventory database 16 by reference to the scanned code. Periodically, an end user scans the barcodes of component inventory 14 with scanner 22 to count the actual inventory for comparison with that stored in component inventory database 14. Upon removal of a component from inventory 14, an end user scans the barcode and updates the status of the component as removed through user interface 20 in order to keep component inventory database 16 up-to-date.

Component order module 18 places orders for components through a network 24, such as the Internet, with a component vendor 26, such as an information handling system manufacturer. A component order engine 28 accepts the component order information and locates a compatible component to fill the order. The component ordering and filling process may vary considerably based on the type and function of the component. For instance, component order module 18 may order specific components, such as specific ink jet cartridges or laser toner cartridges, that component vendor 26 will have to fill with a precise product. Alternatively, where component inventory 14 consists of warranty replacement components to support warranties on information handling systems manufactured by component vendor 26, component order module 18 may provide the identification code of a component removed from inventory 14 for component order engine 18 to replace with a compatible component, such as a hard disc drive or optical drive. In such a situation, component order engine 28 supplies component order information to component order module 18 to adequately identify the component that will fill the order.

Once a component is selected to fill a component order, component order engine 28 arranges for shipment of the component by obtaining a shipment identification code from a shipping number assignment module 30. For instance, component vendor 26 arranges component shipments through a third party shipment vendor 32 that manages delivery with unique shipment identifiers generated by a shipping code assignment engine 34. As a component shipment 36 is transported from component vendor 26 to the component end user location, shipment vendor employees identify the component with a barcode 38 of the unique shipment identification code displayed at the exterior of component 36's package. Shipping number assignment module 30 generally arranges the availability of shipment identification codes in advance so that an adequate shipping capacity is available to component vendor 26. Once a shipment identification code is associated with a component order, component order engine 28 communicates the shipment identification code to component order module 18 so that each of the component vendor, shipment vendor and end user have a common identification code to use in reference to the component.

Inventory manager 12 takes advantage of the availability of uniqueness of the shipment identification code by using the shipment identification code as the inventory reference for the ordered component in component inventory database 16. When ordered component 36 arrives at the end user location, scanner 22 scans the shipment identification barcode 38. Inventory manager 12 inputs the component to database 16 by associating the order information and the shipment identification code, and allows component order module 18 to confirm receipt of the component to component vendor 26 and shipment vendor 32 by reference to the unique code. Since inventory manager 12 uses the shipment identification code, no additional inventory reference numbers are needed. Further, by storing the component in its original container until it is used or otherwise removed from inventory 14, barcode 38 remains affixed to the container to allow inventory counts with the shipment identification code by scanner 22. Upon use of component 36, a scan of the barcode for the shipment identification code provides inventory manager 12 with the reference number of the component as it is removed from the inventory and allows communication of the identification code to component vendor 26 to track component usage or order a replacement component. Alternatively, component 36 may be shipped with a label 40 having a return shipment identification code tracked by component order engine 28. The end user affixes return label 40 to return components to component vendor 26, such as for refurbishment, and component vendor 26 tracks component usage, such as to replenish end user inventory under an existing agreement. For example, laser printer toner component orders are automatically managed without active participation by end user information technology staff with component order engine 28, component order module 18 and inventory manager 12 using shipment identification codes to track delivery, use and return of components.

Figure 2:
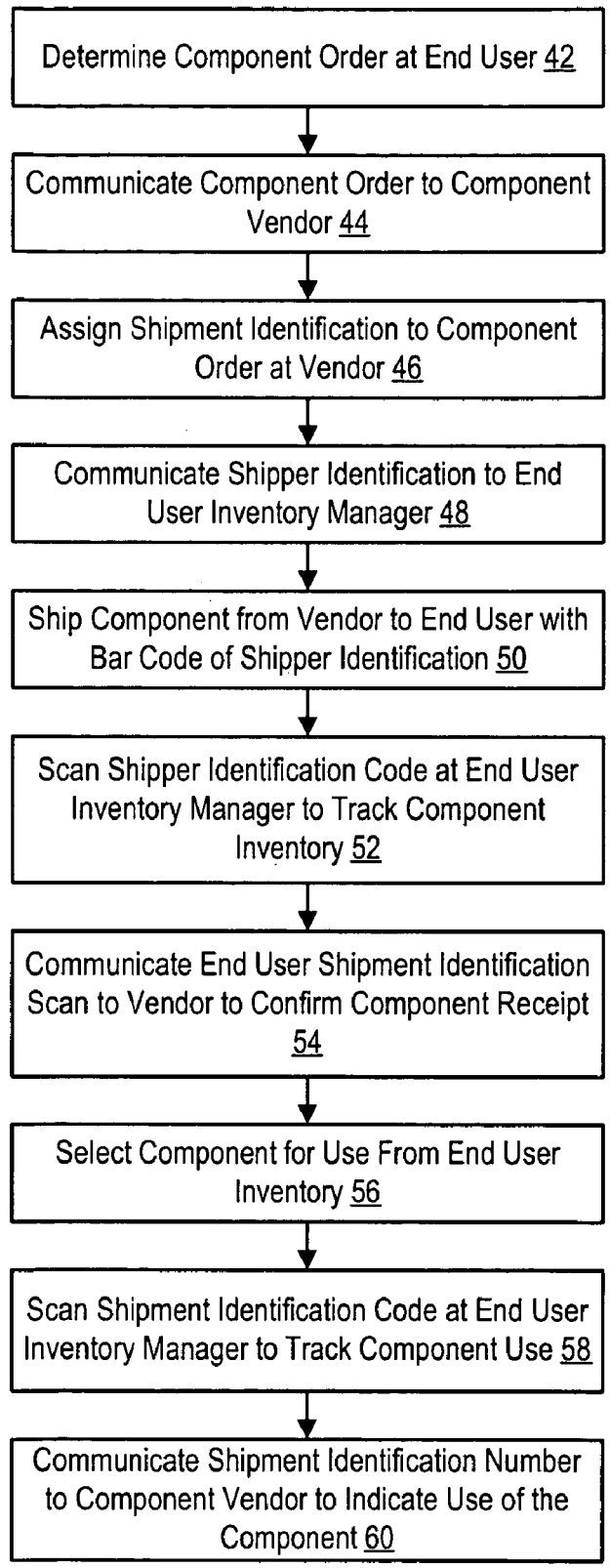
FIG. 2 depicts a flow diagram of a process for managing end user component inventory of components sent by a component vendor with shipment identification codes of a shipment vendor.

Referring now to FIG. 2, a flow diagram depicts a process for managing end user component inventory of components sent by a component vendor with shipment identification codes of a shipment vendor. The process starts with a determination at step 42 by the end user to order a component for storage in an inventory. At step 44, the component order is communicated to the component vendor, such as through the Internet by an automated system or by an end user administrator interfacing with the component vendor's website. At step 46, a shipment identification code is assigned to the component order at the component vendor in cooperation with a shipment vendor. At step 48, the shipment identification code is communicated to the end user for association by the end user inventory manager with the component order. Once the end user inventory manager has the unique shipment identification code, that code is used to reference the component both in communications with the component vendor and in tracking the component's arrival at, storage in and use from the end user's inventory.

At step 50, the component is shipped from the component vendor to the end user in a container having a barcode of the shipment identification code exposed on the exterior. At step 52, the end user scans the barcode to obtain the shipment identification code and enter the component into the inventory manager by reference to the shipment identification code. At step 54, the end user shipment identification code is communicated to the component vendor to confirm the component receipt, such as through the same communication medium as supported the component order. At step 56, the component is selected for use from the inventory by the end user, such as to replace a defective or consumed information handling system component of the end user. At step 58 the shipment identification code is scanned by the end user for the inventory manager to reference in updating the component's status in the inventory, for instance, with update information input by an end user administrator. At step 60, the use of the component is communicated to the component vendor through reference to the shipment identification number to allow a re-order of the component or otherwise update the component vendor. Alternatively, the component vendor tracks use of the component by return of a failed or consumed component for refurbishment which the component replaced. The relationship between returned components and inventory components is maintained by including a return label with the component order and storing the shipment identification code of the return label by association with the original shipment identification code of the component.

Although the present invention has been described in detail, it should be understood that various changes, substitutions and alterations can be made hereto without departing from the spirit and scope of the invention as defined by the appended claims.

What is claimed is:

1. A system for end user component inventory tracking using shipper identification codes, the system comprising:
 a shipping code assignment engine associated with a shipping vendor and operable to assign a shipping identification code for a component shipment from a component vendor to the end user;
 a component order module associated with the end user and operable to order a component from the vendor;
 a component order engine associated with the vendor and interfaced with the shipping code assignment engine and the component order module, the component order engine operable to fill the component order, associate the component order with a shipping identification code and communicate the associated shipping identification code to the component order module; and
 an inventory manager associated with the end user and interfaced with the component order module, the inventory manager operable to track delivery and use of the ordered component with the shipping identification code.

2. The system of claim 1 wherein the shipping identification code comprises a barcode affixed to a shipping container of the component and readable by a scanner.

3. The system of claim 2 further comprising a scanner associated with the inventory manager, the scanner operable to scan the barcode at delivery of the component into an inventory and at selection of the component for use from the inventory.

4. The system of claim 3 wherein inventory manager and component order module are further operable to automatically communicate confirmation of the component delivery to the component order engine upon scanning of the barcode at delivery of the shipment.

5. The system of claim 1 further comprising a shipping container having an interior to contain the component during shipment and an exterior to display the shipping identification code, wherein the component order engine is further operable to associate return shipment of the container with a second shipping identification code, the second identification code affixed to a label included in the container.

6. The system of claim 5 wherein the inventory manager and the component order engine associate the second shipping identification code with a component replaced by the ordered component.

7. The system of claim 1 further comprising an inventory associated with the end user, the inventory having plural component containers, each container having a shipping identification code, wherein the inventory manager is further operable to count the inventory by reference to the shipping identification codes.

8. The system of claim 7 wherein the inventory comprises information handling system components.

9. A method for end user component inventory tracking using shipper identification codes, the method comprising:
communicating orders for a components from an end user to a component vendor;
coordinating shipment identification codes between the component vendor and a shipper vendor for each order;
associating component orders with the shipment identification codes;
packaging the components in containers, the shipment identification codes readable at the exterior of the containers;
shipping the components in the containers from the component vendor through the shipper vendor to the end user;
storing the components in the containers at an inventory of the end user; and
tracking the components in the inventory with the shipping identification codes.

10. The method of claim 9 wherein associating component orders with the shipment identification codes further comprises:
communicating the shipment identification codes to an inventory manager of the end user; and
associating each component order with the shipment identification code specified for tracking shipping of the component container to the end user.

11. The method of claim 9 wherein the shipping identification codes comprise barcodes affixed to the container and readable by a scanner.

12. The method of claim 11 wherein tracking the components in the inventory further comprises:
scanning the barcode at delivery of each component to enter the component in the inventory;
periodically scanning the barcodes of the containers in the inventory to count the inventory; and
scanning the barcode at removal of the component from the inventory for use by the end user.

13. The method of claim 12 further comprising:
communicating the barcode scanned at delivery of each component to the component vendor to confirm delivery of the component; and
communicating the barcode scanned at removal of the component from the inventory to the component vendor to order a replacement component.

14. The method of claim 13 wherein the components comprise information handling system components.

15. The method claim 9 further comprising:
coordinating a return shipment identification code between the component vendor and the shipper vendor for one or more selected of the orders;
including a label having the return shipment identification code in the selected component order shipment;
removing the component from the inventory to replace a failed component;
shipping the failed component to the component vendor with the return shipment identification code label; and
tracking use of the component and refurbishment of the failed component with the return shipment identification code.

16. The method of claim 15 wherein the component comprises a toner cartridge.

17. An information handling system comprising:
a component order module operable to communicate a component order to a component vendor for shipment by a shipment vendor and to receive a shipment identification associated with shipment of the component;
an inventory manager interfaced with the component order module and operable to track delivery to, storage in and removal from an inventory of plural components ordered with the component order module, the component orders tracked by the component order shipment identifications; and
a component inventory database interfaced with the inventory manager and storing components in the inventory with component orders associated with shipment identifications.

18. The information handling system of claim 17 wherein the inventory comprises components stored in shipment containers having the shipment identification affixed as barcodes, the information handling system further comprising a barcode scanner interfaced with the inventory manager and operable to scan the shipment identification barcodes to count components in the inventory.

19. The system of claim 18 further comprising a user interface in communication with the inventory manager and operable to remove a component from the inventory based on a barcode scan of the shipment identification code associated with the component.

20. The system of claim 19 wherein the components comprise information handling system components.

* * * * *